June 30, 1936. W. W. MILLER 2,045,864
ADVERTISING DEVICE
Filed July 15, 1935 3 Sheets-Sheet 1

June 30, 1936.  W. W. MILLER  2,045,864
ADVERTISING DEVICE
Filed July 15, 1935     3 Sheets-Sheet 2
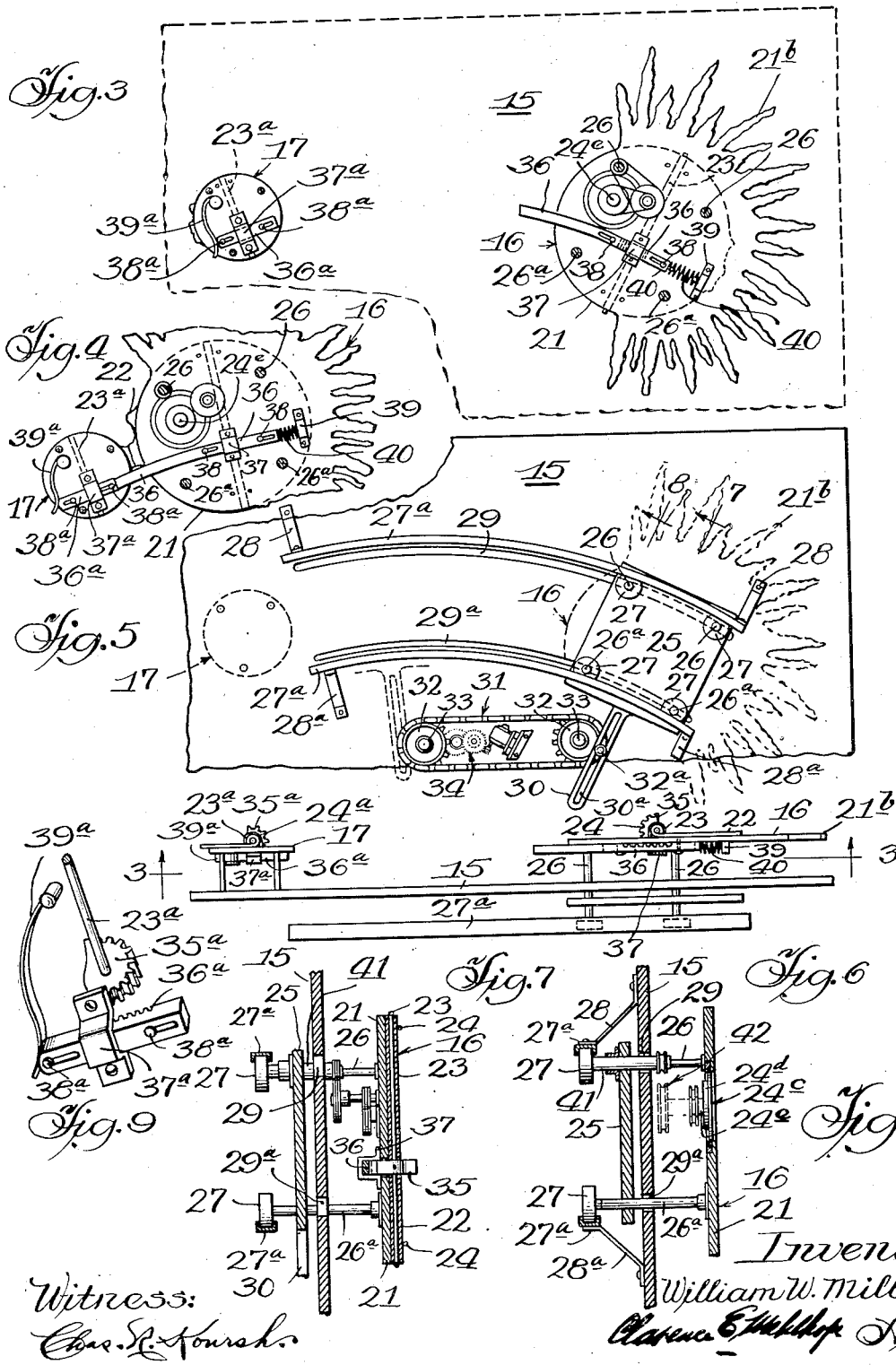

June 30, 1936.  W. W. MILLER  2,045,864
ADVERTISING DEVICE
Filed July 15, 1935  3 Sheets-Sheet 3
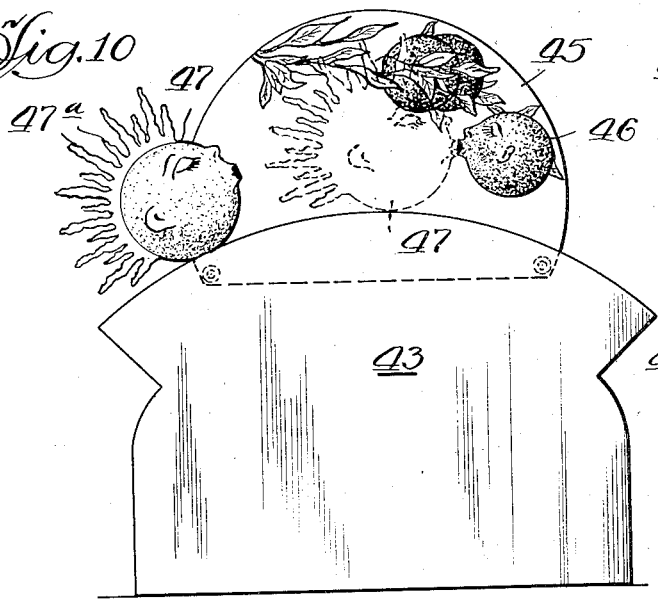
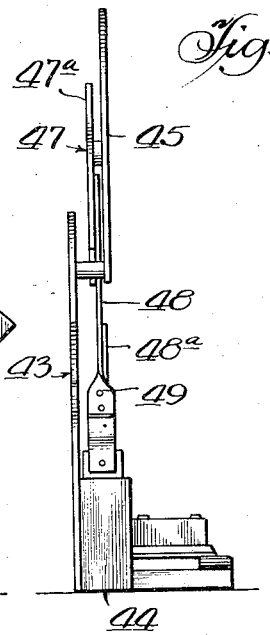
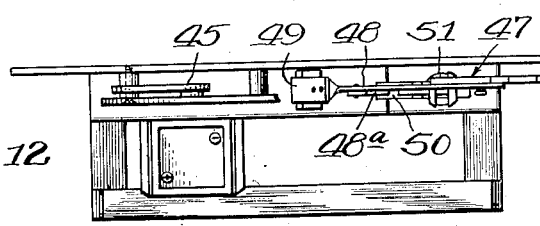
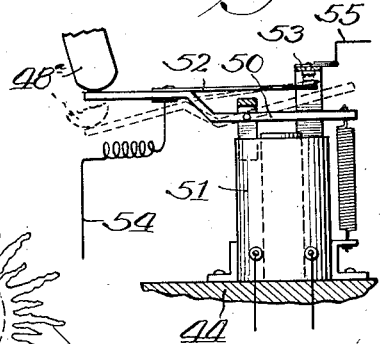
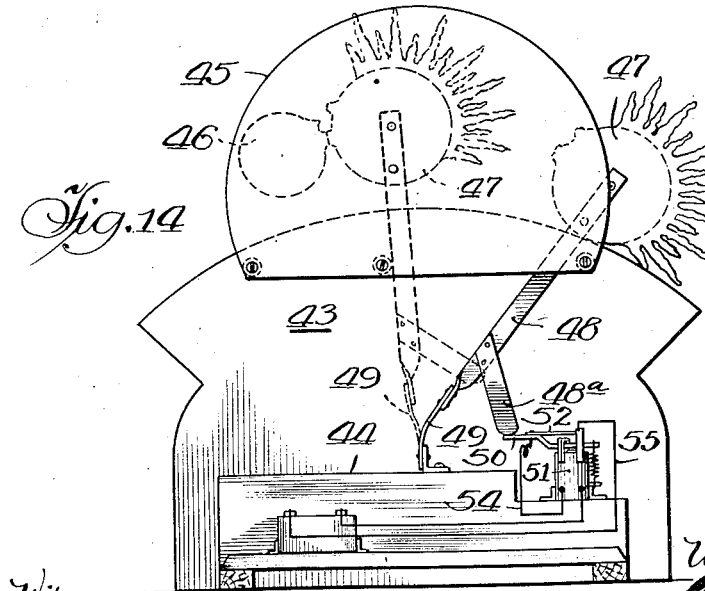
Inventor,
William W. Miller, Patented June 30, 1936

2,045,864

UNITED STATES PATENT OFFICE 2,045,864

ADVERTISING DEVICE

William W. Miller, Berwyn, Ill., assignor to General Outdoor Advertising Co., Inc., Chicago, Ill., a corporation of New Jersey Application July 15, 1935, Serial No. 31,367

5 Claims. (Cl. 40—126)

This invention relates to a novel and improved advertising device and consists of the matters hereinafter described and more particularly pointed out in the appended claims.

The object of the invention is to provide a device or apparatus, automatic in its operation, by means of which an advertising phrase or slogan relating to a commercial product, may be intermittently presented pictorially by mechanical movement.

In the embodiment of the invention shown as an illustration herein, the apparatus is designed to present a widely known advertising phrase relating to fruit—as sun-kissed orange, apple, or the like, and the apparatus at intervals automatically presents to the observer a physical moving illustration of the concept to be conveyed to the observer by the phrase or slogan of the advertisement.

The advantages of the invention will appear from the following description:—

In the drawings:—

Figure 3 is a fragmentary rear view of the board shown in Figure 1 with certain parts removed;

Figure 4 is a detailed view of one of the moving parts of the device;

Figure 5 is a view like Figure 3, but including the parts which do not appear in Figure 3;

Figure 6 is a fragmentary top plan view of the operating apparatus on which view is indicated, by the section line 3—3, the vertical plane of the section shown in Figure 3;

Figure 7 is a vertical sectional view in part in a plane indicated by the line 7—7 of Figure 5;

Figure 8 is a vertical sectional view in part in a plane indicated by the line 8—8 of Figure 5;

Figure 9 is a detailed perspective view to be referred to later;

Figure 1:
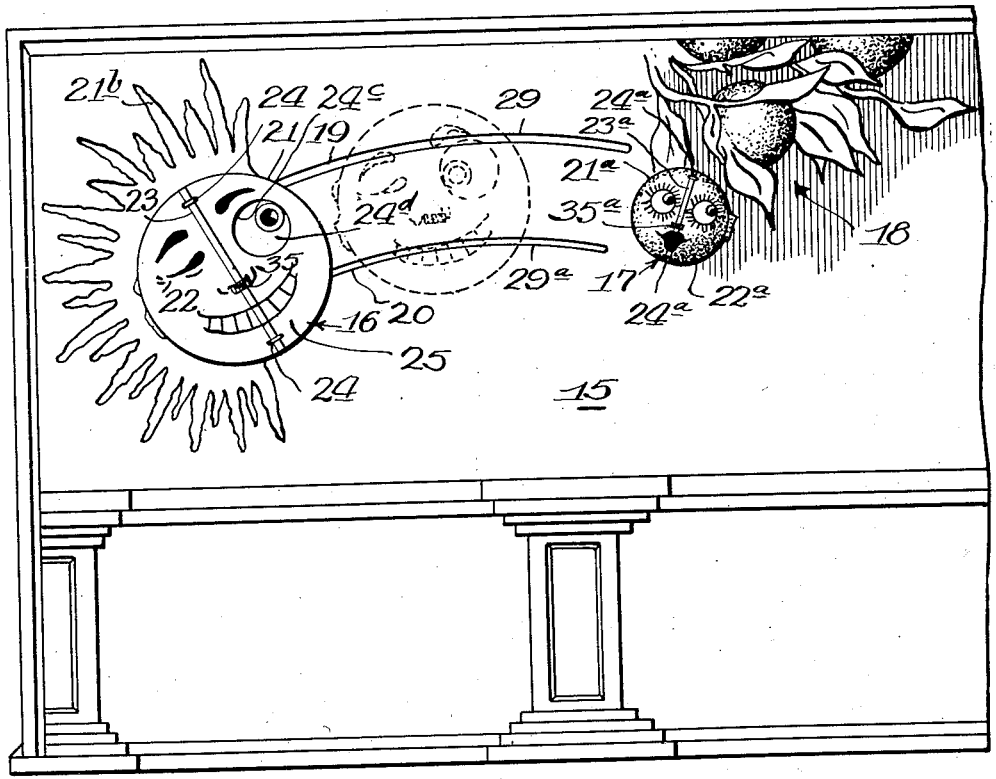
Figure 1 is a view in front elevation of an ordinary roadside sign board, equipped with the improved apparatus.

Figure 10 is a front face view of a modified form of the invention; Figure 11 is a side view; Figure 12 is a rear view of the same;

Figure 13 is a top plan view; and

Figure 14 is a detailed view to be referred to later.

Referring now to that embodiment of the invention illustrated in the drawings, and particularly in Figures 1 to 9, inclusive:—15 indicates a familiar sign board set along the roadside for advertising purposes. The phrase or slogan to be advertised is the one sun-kissed, descriptive of sun ripened fruit. Accordingly, the animate figures of the apparatus are a pictured sun 16 and an orange, apple, or like fruit 17. The sun and the fruit are relatively movable to take the sun from a remote position to a near, contact position with the fruit, in an illustration of the completed act described by the slogan—sun-kissed— and then to return the sun to initial position,— with continued repetition of said alternate movement.

As illustrated, the sun is the movable element. The fruit is fixed and appears as if one of a cluster 18 of its kind, painted or otherwise pictured on the sign board. The sun and fruit are in a common vertical plane in front of the sign board 15.

The sun is a disk 21 provided on the far side with ray extensions 21b. On the near half of the disk 21 is depicted the right half of a full face, with a round opening 24c for the eye. A half disk 22 is hinged at its diametric edge to swing about the diameter of the disk 21, at one side of which appears the right half of the face described. On the opposite side of the half disk 22 is depicted a left half of a face complementary to the said right half of the disk (see Figure 1). On the reverse side of the half disk is depicted half of a face in profile with the nose and lips at the circular edge. When said half disk is swung on its hinge, it is brought to cover the first mentioned half face on the disk 21 and to uncover the half of disk 21 originally covered by it and on which is depicted a half of a head, the ear and the like, complementary to the half face profile on the reverse side of the half disk 22, thus presenting a complete head in profile. (See Figure 2).

The fruit 17 is of similar construction and with like depicted features, except that the parts to show the head and face in profile are in reverse relation with respect to the sun 16. It comprises a disk 21a and a half disk 22a hinged on a diameter common to the two, with half of a full face on the disk 21a on the half of said disk nearer the sun; a half face complementary thereto on the obverse side of said disk and a half profile on its reverse side and a half head in profile on the remote half of the disk 21a.

Figure 2:
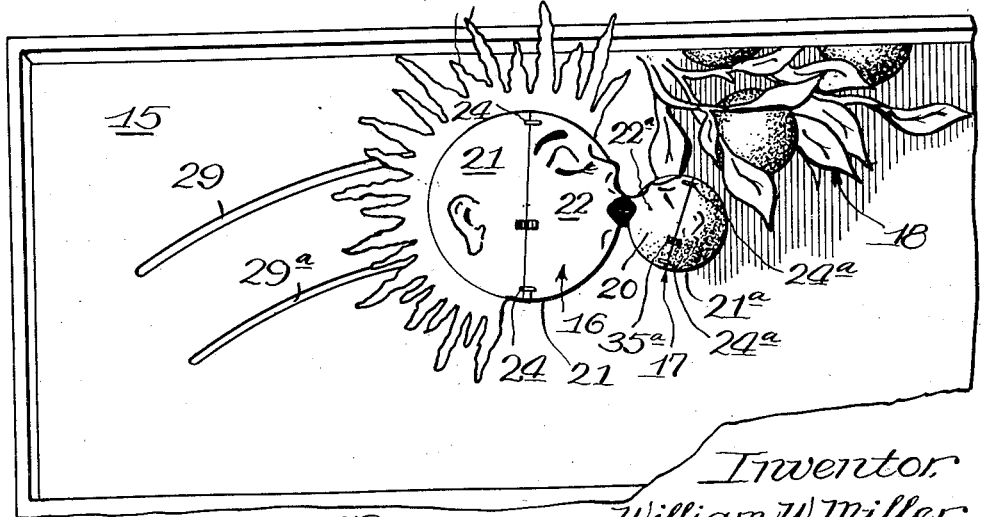
Figure 2 is a like view with the animate figures of the advertisement in the final position suggested or described by the phrase of the slogan.

The facial features of the two, the fruit and the sun, may be drafted to further carry out the suggestion of the slogan or the fancy of the artist, as by the expression shown in the drawing of longing or desire in the full faced view of the fruit, the roguish gallantry in the full faced view of the sun, when the two are in remote relation, as in Figure 1, and the complete satisfaction expressed in the closed eyes and pursed lips of the two when met in the kiss of the slogan, as in Figure 2.

The half disks 22 and 22a are hinged respectively to the disks 21 and 21a by any convenient means. As shown, each half disk has a part bent along its diametric edge to provide a tubular shaft or rod 23 and 23a, respectively. Loops or rings of wire 24 and 24a, taking through suitable holes in the half disk and the disk and secured at the back of the latter in each case, as shown in the drawings, will suffice for the purpose.

Means is included in the apparatus for producing the relative reciprocatory movement of the disks 21 and 21a and of the swing of the half disks 22 and 22a in proper timed relation to produce the result of presenting in continued alternation, the full faced view of the sun and fruit in remote relation, as in Figure 1, and in the final contact relation, as in Figure 2. One form of such means is shown in Figures 3 to 8, inclusive.

The sun disk 21 is attached to a vertical frame or plate 25 located back of the sign board 15 (see Figures 5, 7, and 8) by four vertically and laterally spaced, horizontal rods 26, 26a. The rods 26, 26a project back of the frame 25 and there have fixed to them upper and lower bearing rollers 27, 27, which travel, respectively, in downwardly and upwardly opening channels 27a, 27a, attached to the rear face of said board of bracket arms 28, 28a. The rods 26, 26a, arranged in upper and lower pairs, take through upper and lower slots, respectively, 29, 29a in the sign board 15. Said slots permit the relative movement of the sun disk 21, as described. As shown, they are arcuate.

The frame 25 has a depending radial arm 30. An endless sprocket chain 31 with sprocket wheels, 32, 32, is mounted on horizontal studs 33, 33 fixed to the back of the board 15. A motor and the required reduction gearing for driving one of said sprocket wheels 32 is indicated at 34 in Figure 5. One sprocket wheel 32 is provided with a pin 32a, which engages a slot 30a in the radial arm 30. The arrangement is such that the reciprocatory or alternate movement of the frame 25 to move the sun 16 to and from the fruit 17 is produced at the desired speed.

A pinion 35 is fixed to the hinged rod 23 of the half disk 22 intermediate the ends of said rod. (See Figures 1, 6, and 7). Suitable openings are provided in the half disk and disk adjacent the hinge line to provide room for said pinion. Said pinion engages a short rack 36 located back of the disk 21 and supported by a strap 37 fixed to the back of said disk 21 in such fashion as to permit the rack to have a limited movement at right angles to the rod 23. Pins 38 engage in slots formed in said rack bar to determine the limit of such movement. (See Figure 3).

A stop 39 is fixed to the back of the disk 21 and an expansion coiled spring 40 is interposed between the proximate end of the rack bar and said stop. Like parts, namely, a pinion 35a, rack bar 36a, strap 37a and pins and slots 38a, are associated with the hinged rod 23a at the front of the disk 21a. A leaf spring 39a attached to the back of the disk 21a engages the end of the rack bar 36a remote from the position of the disk 21.

The operation of the mechanism just described is as follows:—When the disk 21 of the sun moves toward the disk 21a of the fruit, the end of the rack bar 36, which projects beyond the disk 21, engages the proximate end of the rack bar 36a. As a result, the two rack bars are pushed in opposite directions to the end of their limit of movement, each rotating its associated hinged rod 23 and 23a. The parts are so proportioned and their movements so timed that this will occur just as the edge of the sun is approaching the proximate edge of the fruit and the hinged movements of the half disk 22 and the half disk 22a will act to bring the two half disks into position, as shown in Figure 2, as the pursed lips come into position for contact.

In the reverse movement of the disk 21 on its return to its original position, the springs 39a and 40 act to retract the rack bars 36 and 36a, respectively, which, through their respective pinions 35 and 35a, return the hinged disks to position, as shown in Figure 1.

A further feature is preferably included in the apparatus. The eye opening 24c is backed by a rotary disk 24d, on which is depicted eccentrically the iris of an eye. Said disk is suitably mounted on the back of the disk 21 and has fixed to it a shaft 24e. One of the upper horizontal rods 26 has a sleeve 41 mounted on it, said sleeve extending through the board 15 and the frame 25 and being fixed to the roller 27 associated with said rod 26. The sleeve 41 is connected through suitable reduction gearing, as by sprockets and chains indicated at 42, to rotate the disk 24d. As will be obvious and as shown in Figure 1, the disk 24d will revolve as in one direction and then in the other direction as the sun disk moves toward the fruit disk, providing a roving movement of the iris of the eye.

An apparatus constructed and designed as hereinbefore described, produces a very effective moving picture composed of mechanically movable elements, which produces an attractive illustration of the phrase or slogan—in this case "sun-kissed".

In Figures 10 to 14, inclusive, is shown a modified form of the apparatus. This is designed more particularly for use on indoor signs, as in window displays or otherwise.

43 indicates the sign board mounted on a base 44 and having a placard 45 projecting up above the top of the sign board 43. The placard has depicted thereon branches and fruit of the kind to be advertised and in front of said placard in the neighborhood of the same is a fixed disk 46 on which appears a profile view of the fruit. 47 indicates the sun disk with the rays 47a. The sun disk likewise is in profile with pursed lips directed towards the position of the fruit. The sun disk 47 is mounted on a radial arm 48 fixed to the base 44 by means of a flat spring 49 permitting said arm to oscillate in a vertical plane. The arm 48 has a heel 48a adapted to strike the spring-controlled armature arm 50 associated with a solenoid 51. 52, 53 indicate contacts bridging a battery circuit 54, 55.

When the heel 48a strikes the armature arm 50, it raises the same to close the contacts 52, 53. This energizes the solenoid, causing the return of the armature 50 to its original position with the contact broken. The force of the return of the arm is sufficient to kick the heel 48a of the radial arm 48 so as to swing the sun disk from its remote position, as shown in Figure 10, to the contact position shown in dotted lines in Figure 10, whereupon the spring 49 will cause the arm 48 to swing back to its first position. This again reproduces the operation first described with the result that there is a continuous swinging movement of the sun from remote to contact position to produce the action suggested and implied by the slogan.

The operating device for this form of the invention can be cheaply acquired and consumes very little current, so that an advertising device of the kind can be run indefinitely at very little cost.

The advantages of the improved apparatus will be apparent from the foregoing description.

I claim as my invention:—

1. An automatically operable mechanical device for picturing an advertising phrase, comprising a signboard, relatively movable members mounted on said signboard and capable of movement from remote to adjacent positions, said members being pictured to present the subjects of the phrase and each including a main plate and an auxiliary plate movable with respect thereto, said plates being pictured with related features so that in one position a full face view is presented and in the other position a profile view is presented, automatic actuating means for producing the relative movement of said subject members in alternation from remote to adjacent position, including devices for producing the relative movement of the plates and auxiliary plates of said subject members in proper timed relation to present a full face view in the remote position and a profile view in the adjacent position.

2. An automatically operable mechanical device for picturing an advertising phrase, comprising a signboard, relatively movable members mounted on said signboard and capable of movement from remote to adjacent positions, said members being pictured to present the subjects of the phrase and each including a main plate and an auxiliary plate movable with respect thereto, said plates being pictured with related features so that in one position one view is presented and in the other position a different view is presented, automatic actuating means for producing relative movements in alternation from remote to adjacent position, including devices for producing the relative movements of the plates and auxiliary plates of said subject members in proper timed relation to present the different views in the remote and adjacent positions.

3. An automatically operable mechanical device for picturing an advertising phrase, comprising a signboard, relatively movable members mounted on said signboard and capable of movement from remote to adjacent positions, said members being pictured to present the subjects of the phrase and each including a main plate and an auxiliary plate hinged thereto, said plates being pictured with related features so that in one position a full view is presented and in the other position a profile view is presented, automatic actuating means for producing the relative movement of said subject members in alternation from remote to adjacent position, including devices for producing the hinged movement of the plates and auxiliary plates of said subject members in proper timed relation to present a full face view in the remote position and a profile view in the adjacent position.

4. An automatically operable mechanical device for picturing an advertising phrase, comprising a signboard, relatively movable members mounted on said signboard and capable of movement from remote to contact positions, said members being pictured, the one to present the sun and the other to present a fruit, the subjects of the phrase, and each including a main plate and an auxiliary plate hinged thereto, said plates being pictured with related features so that in one position a full face view of the sun and of the fruit is presented and in the other position a profile view is presented, automatic actuating means for producing the relative movement of said subject members in alternation from remote to contact positions, including devices for producing the hinged movement of the auxiliary plates on the main plates of said subject members in proper timed relation to present a full face view in the remote position and a profile view in the contact position.

5. An automatically operable mechanical device for picturing an advertising phrase, comprising a signboard, relatively movable members mounted on said signboard and capable of movement from remote to contact positions, said members being pictured, the one to present the sun and the other to present a fruit, the subjects of the phrase, and each including a main plate and an auxiliary plate hinged thereto, said plates being pictured with related features so that in one position a full face view of the sun and of the fruit is presented and in the other position a profile view is presented, automatic actuating means for producing the relative movement of said subject members in alternation from remote to contact positions, including devices for producing the hinged movement of the auxiliary plates on the main plates of said subject members in proper timed relation to present a full face view in the remote position and a profile view in the contact position, a rotary eye mounted in association with the main plate which presents the sun, and means operable in the movement of said sun to rotate said eye.

WILLIAM W. MILLER.